United States Patent
Osaki et al.

(10) Patent No.: US 10,005,424 B2
(45) Date of Patent: Jun. 26, 2018

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Takahiro Osaki, Aichi-ken (JP); Tomonari Umakoshi, Aichi-ken (JP); Yuya Nagata, Aichi-ken (JP); Takuhiro Saito, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 189 days.

(21) Appl. No.: 15/134,936

(22) Filed: Apr. 21, 2016

(65) Prior Publication Data

US 2016/0311398 A1    Oct. 27, 2016

(30) Foreign Application Priority Data

Apr. 24, 2015    (JP) .................................. 2015-089194

(51) Int. Cl.
*B60R 22/44*    (2006.01)
*B60R 22/46*    (2006.01)

(52) U.S. Cl.
CPC ............. *B60R 22/44* (2013.01); *B60R 22/46* (2013.01); *B60R 2022/4453* (2013.01); *B60R 2022/4466* (2013.01); *B60R 2022/468* (2013.01); *B60R 2022/4666* (2013.01)

(58) Field of Classification Search
CPC ... B60R 22/44; B60R 22/46; B60R 2022/468; B60R 2022/4453; B60R 2022/4466
See application file for complete search history.

(56) References Cited

U.S. PATENT DOCUMENTS

2005/0224621 A1    10/2005  Mori
2013/0341451 A1*   12/2013  Saito ...................... B60R 22/46
                                                  242/381.5

FOREIGN PATENT DOCUMENTS

EP        2676851 A1    12/2013
JP        2009-51419     3/2009

OTHER PUBLICATIONS

Extended European Search Report for corresponding European Patent Application No. 16166554.2 dated Sep. 27, 2016.

* cited by examiner

*Primary Examiner* — Sang K Kim
(74) *Attorney, Agent, or Firm* — Roberts Mlotkowski Safran Cole & Calderon, P.C.

(57) ABSTRACT

A webbing take-up device includes a second clutch that transmits rotation of a motor to a spool. The second clutch includes a base including a first spring catch portion, a clutch gear, a clutch spring including a coil portion, having an end portion at one side caught to the first spring catch portion, and a lever that includes a second spring catch portion catching an end portion at another side of the clutch spring, and that enlarges diameter of the coil portion to abut the clutch gear by moving the end portion at the another side of the clutch spring toward one side in the circumferential direction of the base. A terminal end of the end portion at the one side of the clutch spring abuts the first spring catch portion when the lever is rotated toward the one side in the circumferential direction of the base.

12 Claims, 11 Drawing Sheets

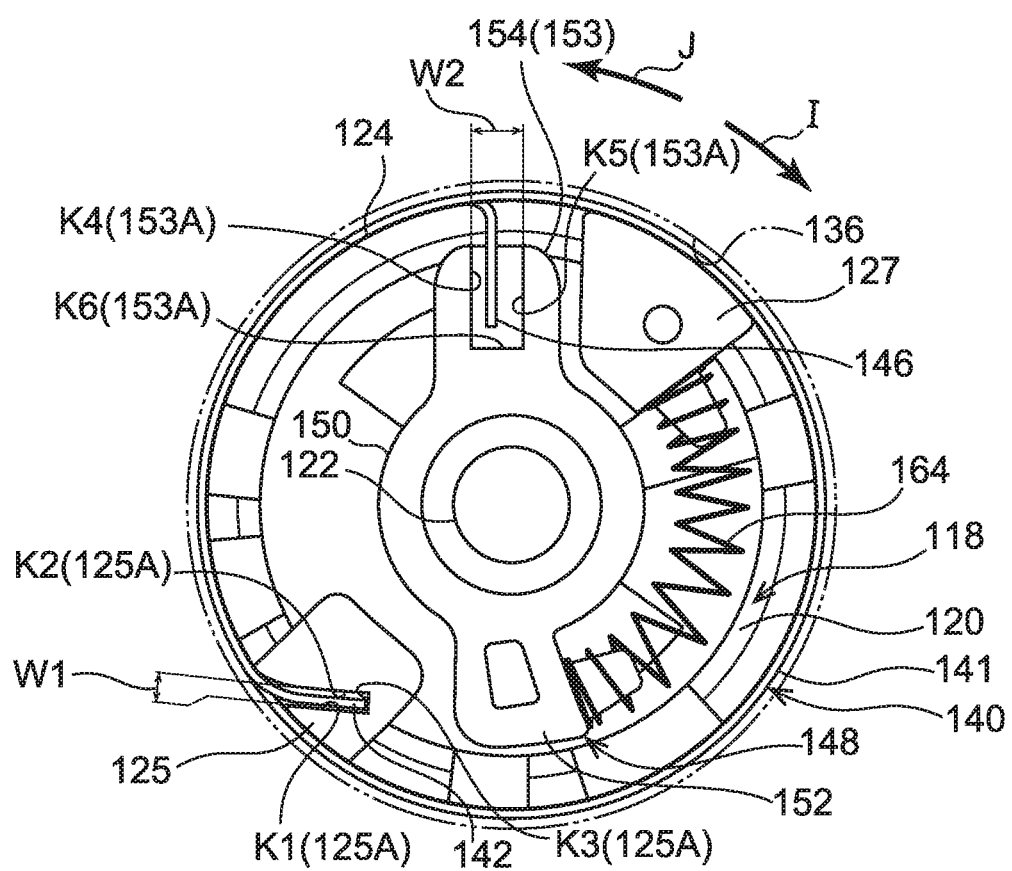

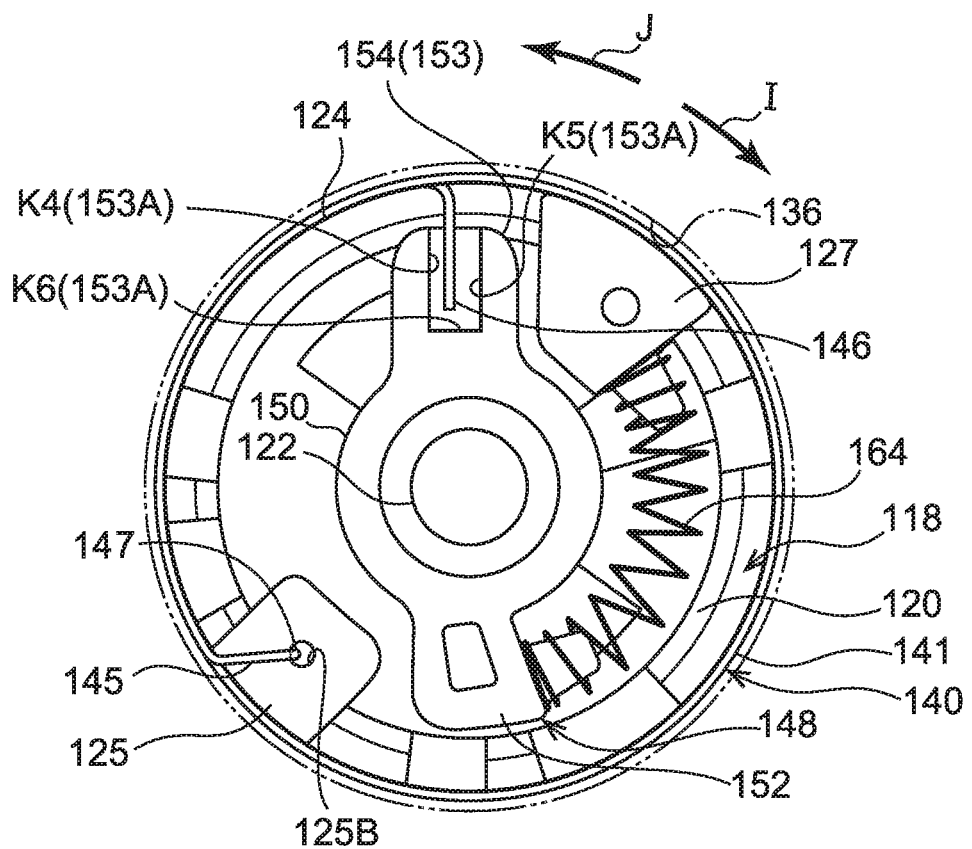

WEBBING TAKE-UP DEVICE

CROSS-REFERENCE TO RELATED APPLICATION

This application claims priority under 35 USC 119 from Japanese Patent Application No. 2015-089194, filed Apr. 24, 2015, the disclosure of which is incorporated by reference herein.

BACKGROUND

Field of the Invention

The present invention relates to a webbing take-up device configuring a vehicle seatbelt device.

Related Art

Japanese Patent Application Laid-Open (JP-A) No. 2009-51419 describes a webbing take-up device including a clutch that is capable of transmitting rotation of a motor to a spool (spindle). The clutch described in JP-A No. 2009-51419 is configured including a pin member that rotates integrally together with a final gear to which drive force of the motor is transmitted, a latch ring that rotates together with the spool, and a friction spring that is disposed at an outer peripheral portion of the latch ring, whose one end is fixed to the pin member, and whose another end is retained by a lower cover. Due to the motor being rotated toward one side, the final gear is rotated toward the one side, and due to the friction spring being decreasing a diameter thereof, the friction spring engages with an outer peripheral face of the latch ring. Rotation of the motor toward the one side is thereby transmitted to the spool (spindle). When, due to the motor being rotated toward another side, the final gear is rotated in another direction, the diameter of the friction spring does not decrease, and thus the friction spring does not engage with the outer peripheral face of the latch ring. Accordingly, rotation of the motor toward the another side is not transmitted to the spool (spindle).

However, in a configuration in which a friction spring is repeatedly deformed such as in the webbing take-up device described in JP-A No. 2009-51419, it is desirable to improve the durability of the spring with respect to repeated deformations.

SUMMARY

In consideration of the above circumstances, the present invention obtains a webbing take-up device capable of improving the durability of a spring with respect to repeated deformations.

A webbing take-up device of a first aspect includes: a spool that takes up a webbing that is to be worn by an occupant; a first rotating body that includes a first spring catch portion; a second rotating body that is provided so as to be capable of rotating integrally with the spool, and that rotates due to rotation of the first rotating body being transmitted to the second rotating body; a spring that is provided between the first rotating body and the second rotating body, and that includes a coil portion wound into a ring shape along an outer circumferential portion of the first rotating body, an end portion at one side of the spring being caught at the first spring catch portion; and a lever that is capable of rotating in a circumferential direction of the first rotating body, that includes a second spring catch portion to which an end portion at another side of the spring is caught, and that enlarges a diameter of the coil portion by moving the end portion at the another side of the spring toward one side in the circumferential direction of the first rotating body in a case in which the lever is rotated toward the one side in the circumferential direction of the first rotating body so as to transmit rotation of the first rotating body to the second rotating body via the coil portion, wherein, in a case in which the lever is rotated toward the one side in the circumferential direction of the first rotating body, at least one of a terminal end of the end portion at the one side of the spring or a terminal end of the end portion at the another side of the spring abuts either the first spring catch portion or the second spring catch portion.

A webbing take-up device of a second aspect includes: a spool that takes up a webbing that is to be worn by an occupant; a first rotating body that includes a first spring catch portion; a second rotating body that is provided so as to be capable of rotating integrally with the spool, and that rotates due to rotation of the first rotating body being transmitted to the second rotating body; a spring that is provided between the first rotating body and the second rotating body, and that includes a coil portion wound into a ring shape along an outer circumferential portion of the first rotating body, an end portion at one side of the spring being caught at the first spring catch portion; and a lever that is capable of rotating in a circumferential direction of the first rotating body, that includes a second spring catch portion to which an end portion at another side of the spring is caught, that enlarges a diameter of the coil portion by moving the end portion at the another side of the spring toward one side in the circumferential direction of the first rotating body in a case in which the lever is rotated toward the one side in the circumferential direction of the first rotating body so as to transmit rotation of the first rotating body to the second rotating body via the coil portion, wherein, in a case in which the lever is rotated toward the one side in the circumferential direction of the first rotating body, at least one of the end portion at the one side of the spring or the end portion at the another side of the spring moves while remaining caught at either the first spring catch portion or the second spring catch portion.

A webbing take-up device of a third aspect is the webbing take-up device of the first aspect, wherein the end portion at the one side of the spring abuts the first spring catch portion when the lever is rotated toward the one side in the circumferential direction of the first rotating body.

In the third aspect, it is possible that the first spring catch portion is one of a groove portion or a hole portion, which extends from an outer circumference side of the first rotating body toward an inner side of the first rotating body, an end portion at the outer circumference side of the first spring catch portion being opened, and an end portion at the inner side being formed with a wall portion; and the terminal end of the end portion at the one side of the spring abuts the wall portion when the lever is rotated toward the one side in the circumferential direction of the first rotating body.

A webbing take-up device of a fourth aspect is the webbing take-up device of the second aspect, wherein the end portion at the one side of the spring moves while remaining caught at the first spring catch portion when the lever is rotated toward the one side in the circumferential direction of the first rotating body.

In the fourth aspect, it is possible that the first spring catch portion is a hole portion which extends in a direction of an axis of rotation of the first rotating body; and the end portion at the one side of the spring moves inside the hole portion while remaining disposed inside the hole portion when the lever is rotated toward the one side in the circumferential direction of the first rotating body.

A webbing take-up device of a fifth aspect is the webbing take-up device of any one of the first aspect to the fourth aspect, wherein, in a state in which the diameter of the coil portion has been enlarged, the second rotating body rotates the lever toward another side in the circumferential direction of the first rotating body via the coil portion of the spring and the end portion at the another side of the spring, due to the webbing being pulled with greater than a specific tensile force.

In the webbing take-up device of the first aspect and the second aspect, the webbing that is worn by the occupant is taken up onto the spool. When the lever is rotated toward the one side in the circumferential direction of the first rotating body in a state in which the first rotating body is rotated, the diameter of the coil portion of the spring is enlarged, and rotation force of the first rotating body is transmitted to the second rotating body. The spool is rotated due to transmitting the rotation force of the second rotating body to the spool.

Note that in the webbing take-up device of the first aspect, when the lever is rotated toward the one side in the circumferential direction of the first rotating body, at least one of the terminal end of the end portion at the one side of the spring or the terminal end of the end portion at the another side of the spring abuts corresponding the first spring catch portion or the second spring catch portion. This thereby enables to generate a compression load on the end of the spring, at which the terminal end of this end portion abuts corresponding the first spring catch portion or the second spring catch portion. Further this thereby enables to alleviate (soften) a bending stress arising in the end portion of the spring, at which the terminal end of this end portion abuts corresponding the first spring catch portion or the second spring catch portion. This thereby enables an increase in the durability of the spring with respect to repeated deformations.

According to the webbing take-up device of the second aspect, when the lever is rotated toward the one side in the circumferential direction of the first rotating body, at least one of the end portion at the one side of the spring or the end portion at the another side of the spring moves for example in a radial direction of the first rotating body while remaining caught to corresponding the first spring catch portion or the second spring catch portion. This thereby enables stress arising on the end portion of the spring, which end portion is capable of moving for example in the radial direction of the first rotating body while remaining caught to corresponding the first spring catch portion or the second spring catch portion, to be dispersed in this end portion. Namely, this end portion being locally deformed can be suppressed. This thereby enables an increase in the durability of the spring with respect to repeated deformations.

Note that when rotation force toward a side in which the diameter is enlarged in the coil portion of the spring is input from the second rotating body to the another end portion of the spring, stress is liable to increase in the end portion of the spring, which is at the side caught to the first spring catch portion of the first rotating body. However, in the webbing take-up device of the third aspect or the fourth aspect, the terminal end of the end portion on the one side of the spring abuts the first spring catch portion, or the end portion on the one side of the spring moves for example in the radial direction of the first rotating body while remaining caught to the first spring catch portion, thereby enabling bending stress arising in the end portion on the one side of the spring to be alleviated, or the end portion on the one side of the spring being locally deformed can be suppressed. This thereby enables an increase in the durability of the spring with respect to repeated deformations.

In the webbing take-up device of the fifth aspect, when the webbing is pulled with greater than the specific tensile force, the second rotating body rotates the lever toward the another side in the circumferential direction of the first rotating body via the coil portion of the spring and the end portion at the another side of the spring. This thereby reduces the diameter of the coil portion of the spring. Namely, the present exemplary embodiment enables the spool to be separated from the first rotating body when the webbing is pulled with greater than the specific tensile force. This thereby enables the applying of excessive force on the respective components to be suppressed.

BRIEF DESCRIPTION OF THE DRAWINGS

An exemplary embodiment will be described with reference to the following figures, wherein:

FIGS. 8A and 8B illustrate a partial configuration of a second clutch that is a configuration member of a webbing take-up device, wherein FIG. 8A is a side view illustrating a normal state of a clutch spring, and FIG. 8B is a side view illustrating a state in which an external diameter dimension of a coil portion of the clutch spring has been enlarged; and FIGS. 9A and 9B illustrate a partial configuration of a second clutch provided with a first catch portion of a clutch spring according to a modified example, and a first spring catch portion according to a modified example, wherein FIG. 9A is a side view illustrating a normal state of the clutch spring, and FIG. 9B is a side view illustrating a state in which an external diameter dimension of a coil portion of the clutch spring has been enlarged.

DETAILED DESCRIPTION

Explanation follows regarding a webbing take-up device of an exemplary embodiment, with reference to FIG. 1 to FIGS. 9A and 9B.

Figure 1:
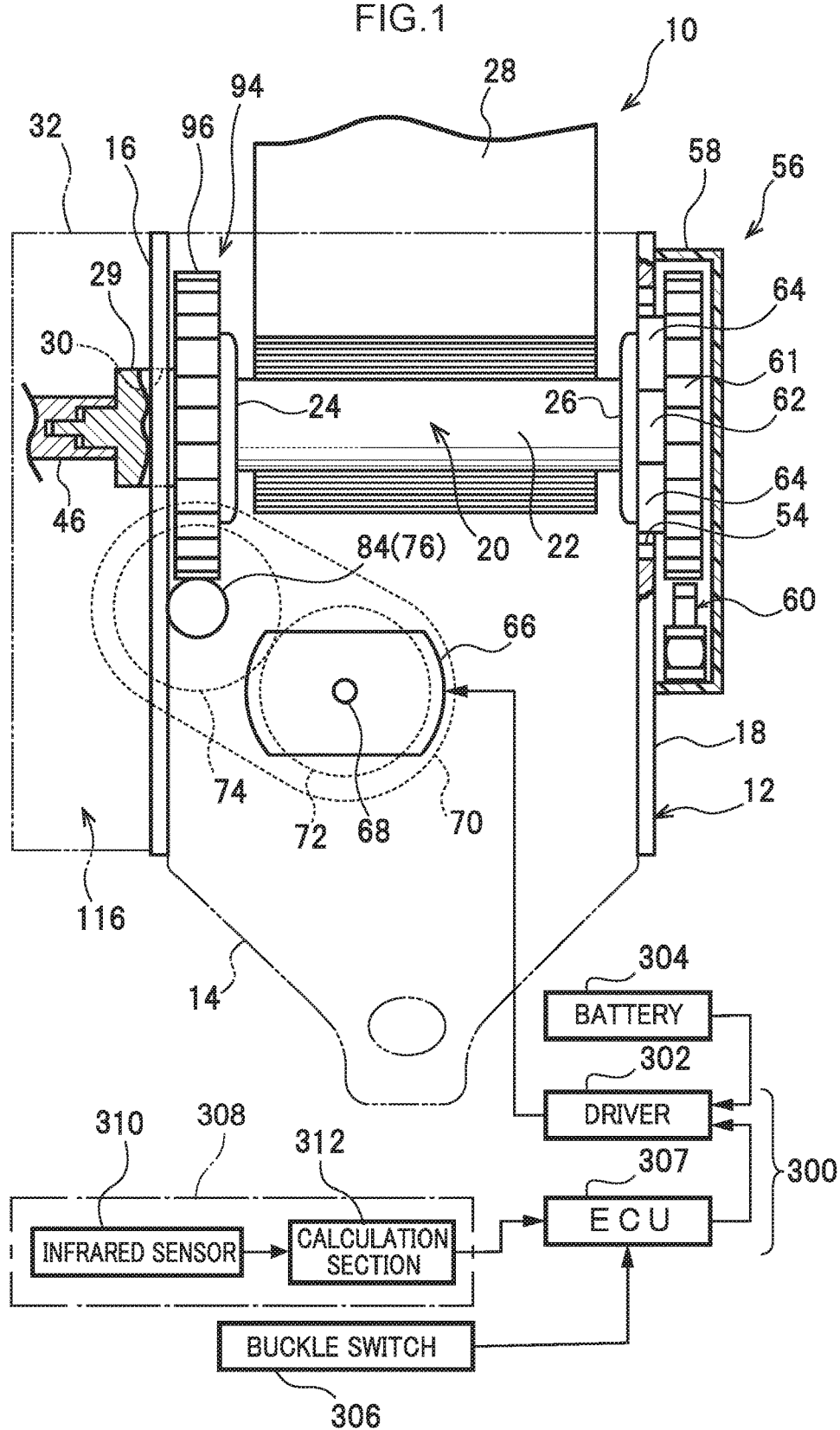
FIG. 1 is a schematic back face cross-section illustrating an overall configuration of a webbing take-up device according to an exemplary embodiment.

FIG. 1 is a schematic back face cross-section illustrating an overall configuration of a webbing take-up device 10 according to an exemplary embodiment. As illustrated in FIG. 1, the webbing take-up device 10 includes a frame 12. The frame 12 includes a substantially plate shaped back plate 14. The back plate 14 is fixed to a vehicle body by a fastening member, not illustrated in the drawings, such as a bolt, thereby fixing the webbing take-up device 10 to the vehicle body. A pair of parallel leg pieces 16 and 18 extend from both width direction ends of the back plate 14, and a spool 20, manufactured by die-casting or the like, is rotatably disposed between the leg pieces 16 and 18.

The spool 20 includes a substantially circular cylinder shaped spool body 22 and a pair of flange portions 24 and 26 respectively formed in substantially circular disk shapes at both end portions of the spool body 22. Overall, the spool 20 is formed in a shape resembling a cotton reel.

A base end portion of webbing 28 formed in an elongated belt shape is fixed between the flange portions 24 and 26 of the spool body 22. Rotating the spool 20 toward one direction about its axis (in a direction referred to below as the "take-up direction") takes up the webbing 28 onto an outer circumferential portion of the spool body 22 in a layered shape from a base end side. Pulling the webbing 28 from a leading end side pulls out the webbing 28 taken up onto the outer circumferential portion of the spool body 22, accompanying which the spool 20 rotates in the opposite direction to the rotation direction during take-up of the webbing 28 (the rotation direction of the spool 20 when pulling out the webbing 28 is referred to below as the "pull-out direction").

The spool 20 also includes a support shaft portion 29 projecting out coaxially from an end portion of the spool 20 on the flange portion 24 side. The support shaft portion 29 penetrates a circular hole 30 formed in the leg piece 16 substantially coaxially, and projects out to the exterior of the frame 12.

Figure 2:
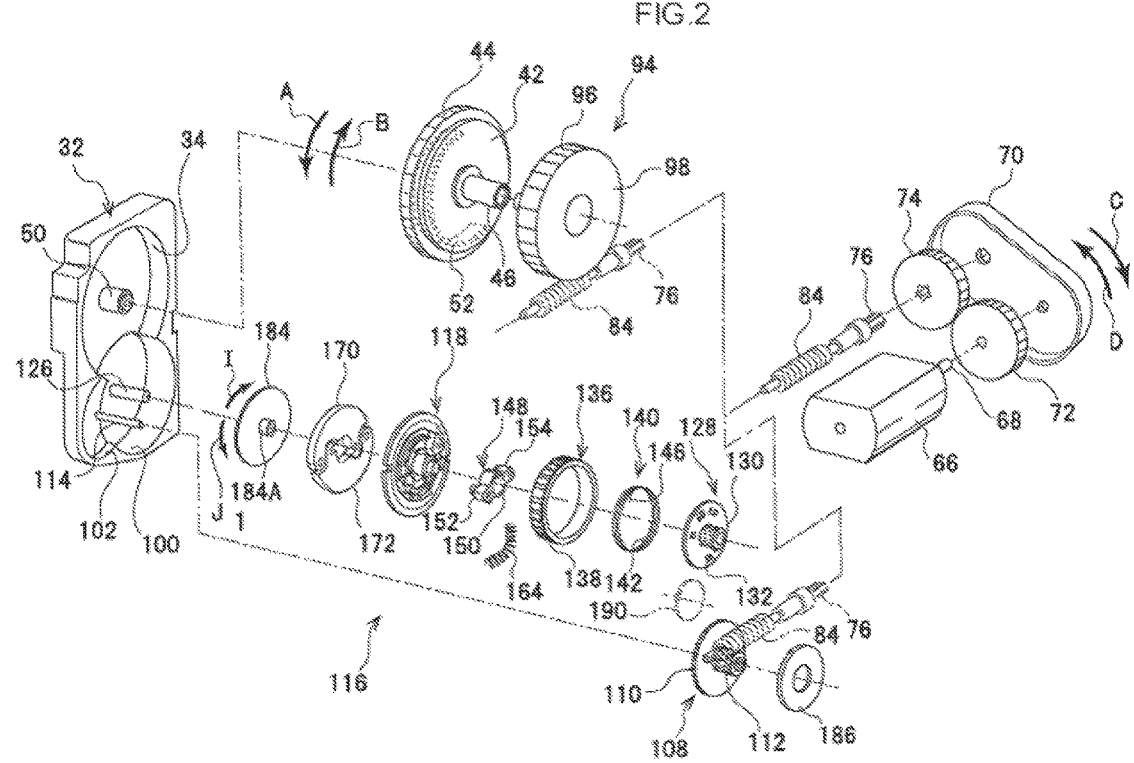
FIG. 2 is an exploded perspective view illustrating a configuration of relevant portions of a webbing take-up device.

A case 32 configuring a reverse rotation drive force transmission section is disposed at the outside of the frame 12 on the leg piece 16 side. The case 32 is disposed facing the leg piece 16 along the axial direction of the spool 20, and is fixed to the leg piece 16. As illustrated in FIG. 2, the case 32 is provided with a case body 38 including a first housing portion 34 and a second housing portion 100 that have circular shaped cross-sections, a third housing portion 102 that has a substantially semicircular shaped cross-section, and a thin plate shaped cover, not illustrated in the drawings, that closes off the first housing portion 34, the second housing portion 100, and the third housing portion 102.

A container (barrel drum) 42 configuring the reverse rotation drive force transmission section is housed inside the first housing portion 34 of the case body 38.

The container 42 is formed in a bottomed circular cylinder shape that opens toward the opposite side to the leg piece 16 and has a short axial direction dimension. An outer circumferential portion of the container 42 is formed with outer teeth 44. The outer teeth 44 configure a spur gear.

A face on the leg piece 16 side of a bottom wall of the container 42 is provided with a circular cylinder shaped coupling portion 46 projecting out coaxially. The coupling portion 46 is coaxially and integrally coupled to the support shaft portion 29 (see FIG. 1) that penetrates the circular hole 30 of the leg piece 16.

A face of the bottom wall of the container 42 on the opposite side to the leg piece 16 is provided with a support shaft, not illustrated in the drawings, projecting out coaxially to the container 42. The support shaft is rotatably supported by a shaft receiving 50 projecting from a central portion of the first housing portion 34. The support shaft portion 29 side of the spool 20 is thereby rotatably supported by the case 32 through the container 42.

Figure 3:
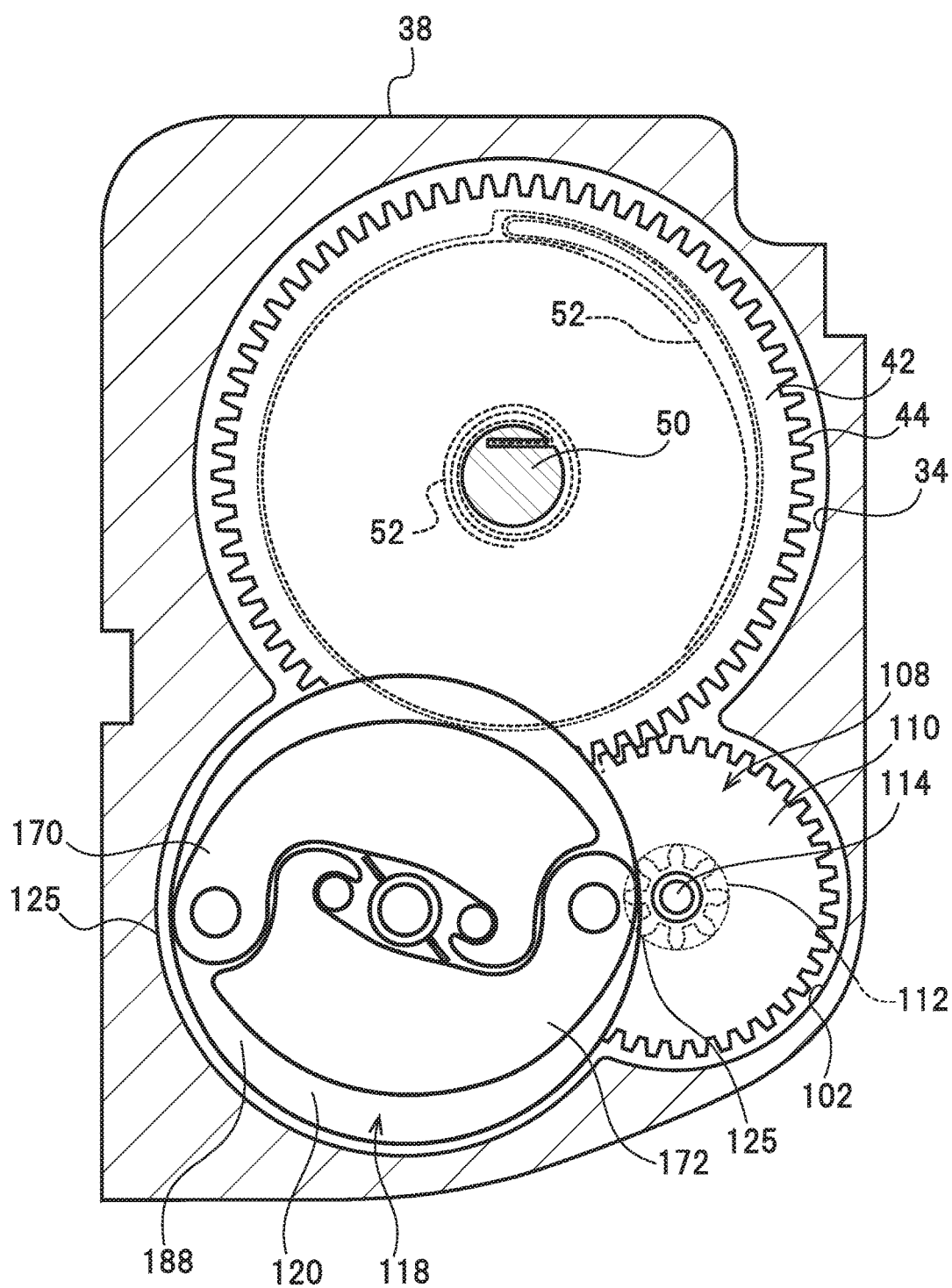
FIG. 3 is a side cross-section illustrating a partial configuration of a second clutch that is a configuration member of a webbing take-up device.

As illustrated in FIG. 3, a spiral spring 52 is housed inside the container 42. An inner end of the spiral spring 52 is caught to the shaft receiving 50 of the case body 38, and an outer end of the spiral spring 52 is caught to the container 42. The spiral spring 52 urges the spool 20 toward the take-up direction through the container 42.

The urging force of the spiral spring 52 (a take-up force in the webbing 28 resulting therefrom) is set comparatively weak, at a level that eliminates slack in the webbing 28 when worn by an occupant. In other words, the urging force of the spiral spring 52 is set with a strength that takes into account constriction of the occupant in a state wearing the webbing 28, and does not require enough strength to take up the webbing 28 pulled out from the spool 20 completely, against friction and the like acting on the webbing 28.

The spool 20 illustrated in FIG. 1 includes a support shaft portion, not illustrated in the drawings, projecting out coaxially from an end portion of the spool 20 on the flange portion 26 side. The support shaft portion substantially coaxially penetrates an inner-toothed ratchet hole 54 formed in the leg piece 18, projects out to the exterior of the frame 12, and is rotatably supported by a substantially cup shaped case 58 of which an open end is fixed in a state abutting an outer face of the leg piece 18, and that configures a lock mechanism 56.

The lock mechanism 56 normally permits free rotation of the spool 20 in the take-up direction and the pull-out direction, and prevents rotation of the spool 20 in the pull-out direction during sudden vehicle deceleration. In the present exemplary embodiment, configuration is made such that when an acceleration sensor 60 prevents rotation of a ratchet gear 61 in the pull-out direction, a lock plate 64 projects out from a lock base 62 and meshes together with the inner teeth of the ratchet hole 54 of the leg piece 18 due to relative rotation between the ratchet gear 61 and the spool 20, thereby preventing rotation of the spool 20 in the pull-out direction. Note that configuration may be made in which a torsion bar couples between the lock base 62 and the spool 20 such that after the locking described above, rotation of the spool 20 in the pull-out direction is permitted while twisting the torsion bar in order to achieve energy absorption (achieve a force limiter function).

The webbing take-up device 10 also includes a motor 66. The motor 66 is disposed below the spool 20 between the pair of leg pieces 16 and 18 of the frame 12, and is retained fixed to the frame 12 (not illustrated in the drawings). An output shaft 68 of the motor 66 projects out toward the opposite side to the back plate 14, and a gear housing 70 is provided on the output shaft 68 side.

The gear housing 70 is integrally fixed to the frame 12 by fastening members such as screws. A leading end side of the output shaft 68 of the motor 66 is rotatably supported by the gear housing 70.

As illustrated in FIG. 2, a pair of gears 72, 74 with respective outer teeth configuring spur gears are housed inside the gear housing 70 in a meshed state. The gear 72 is integrally coupled coaxially, and attachably and detachably, to the output shaft 68. The gear 74 has a larger pitch circle and a greater number of teeth than the gear 72, and is integrally coupled coaxially, and attachably and detachably, to a worm shaft 76 that has an axial direction parallel to that of the output shaft 68.

Figure 4:
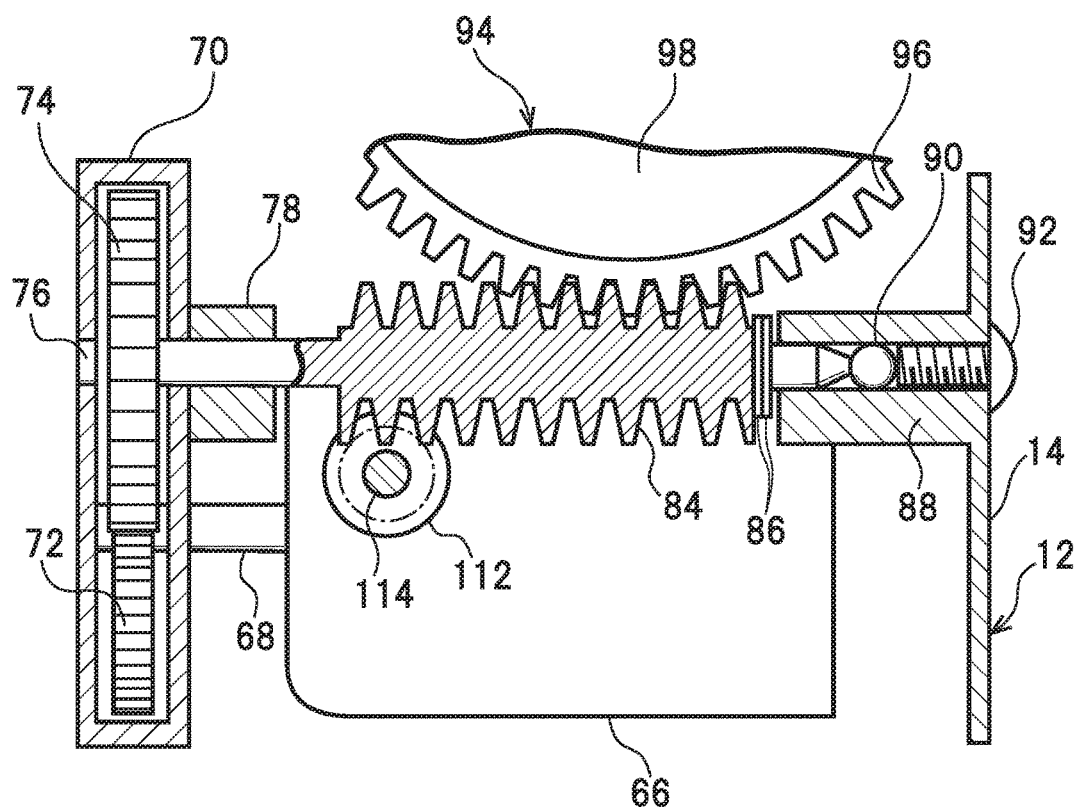
FIG. 4 is a side cross-section illustrating a configuration of peripheral members, including a motor, that are configuration members of a webbing take-up device.

As illustrated in FIG. 4, the worm shaft 76 projects out from the gear housing 70, and one end side of the worm shaft 76 penetrates a shaft receiving 78 formed integrally to the leg piece 16 (see FIG. 1). A shaft receiving 88 is provided at another end side of the worm shaft 76. The shaft receiving 88 is formed in a substantially tube shape, and a steel ball 90 is housed inside the shaft receiving 88. An external diameter dimension of the steel ball 90 is ever so slightly smaller than an internal diameter dimension of the shaft receiving 88, and the steel ball 90 is in contact with an end portion of the another end of the worm shaft 76, the another end of the worm shaft 76 being configured in a tapering shape.

An inner peripheral portion of the shaft receiving 88 is configured with a female thread on the opposite side of the steel ball 90 to the worm shaft 76, and an adjusting screw 92 is screwed in from an open end on the back plate 14 side. A leading end portion of the adjusting screw 92 presses the steel ball 90 so as to place the steel ball 90 in pressing contact with a leading end of the worm shaft 76. Axial direction displacement of the worm shaft 76 is thereby restricted.

At an axial direction intermediate portion of the worm shaft 76, a worm gear 84 that meshes together with a worm wheel 96, described later, and a with worm wheel portion 112 of an output branching gear 108, is integrally provided to the worm shaft 76.

As illustrated in FIG. 2, a first clutch 94 configuring a forward rotation drive force transmission section is provided above the worm gear 84 described above. The first clutch 94 includes the worm wheel 96 formed in a ring shape. The worm wheel 96 is provided so as to be capable of rotating coaxially to and relative to the spool 20 between the leg piece 16 and the flange portion 24. Both axial direction ends of the worm wheel 96 are closed off by a circular disk shaped member 98.

The first clutch 94 includes an adaptor, not illustrated in the drawings. The adaptor is provided coaxially and integrally to the spool 20 (see FIG. 1) between the flange portion 24 and the support shaft portion 29, penetrates the circular disk shaped member 98 of the worm wheel 96 so as to be capable of sliding against the circular disk shaped member 98, and supports the circular disk shaped member 98 so as to enable rotation when the worm wheel 96 is meshed together with the worm gear 84.

A transmission member, not illustrated in the drawings, is housed inside the worm wheel 96. In the first clutch 94, the transmission member connects the worm wheel 96 and the adaptor together to enable rotation transmission when the worm wheel 96 rotates in the take-up direction (the arrow A direction in FIG. 2). The first clutch 94 is configured such that the mechanical connection by the transmission member returns to a released state when the worm wheel 96 rotates in the pull-out direction (the arrow B direction in FIG. 2), or when the worm wheel 96 stops (when coupling member load is eliminated).

The first clutch 94 configured as described above is configured such that rotation force of the output shaft 68 of the motor 66 is transmitted to the worm wheel 96 through the gears 72 and 74, the worm shaft 76, and the worm gear 84. Configuration is made such that when the output shaft 68 of the motor 66 rotates in a forward direction (the arrow C direction in FIG. 2), the worm wheel 96 is rotated in the take-up direction (the arrow A direction in FIG. 2), and when the output shaft 68 of the motor 66 rotates in a reverse direction (the arrow D direction in FIG. 2), the worm wheel 96 rotates in the pull-out direction (the arrow B direction in FIG. 2).

The output branching gear 108 configuring the reverse rotation drive force transmission section is housed inside the third housing portion 102 of the case body 38. The output branching gear 108 includes a gear portion 110 that is a spur gear, and a worm wheel portion 112 that is coaxially and integrally provided to one axial direction end side of the gear portion 110 and that is formed with worm wheel teeth at an outer circumferential portion. A circular through hole is formed at the axial center of the gear portion 110 and the worm wheel portion 112, and a circular column shaped support rod 114 projecting out at a central portion of a bottom wall of the third housing portion 102 is inserted into the through hole, thereby supporting the output branching gear 108 on the case body 38 so as to be capable of rotating about the support rod 114.

The worm wheel portion 112 of the output branching gear 108 has a smaller diameter than the gear portion 110, and is exposed (projects out) to the outside of the case 32. The worm wheel portion 112 meshes together with the worm gear 84 configuring the forward rotation drive force transmission section and the reverse rotation drive force transmission section. Accordingly, when the worm gear 84 (worm shaft 76) rotates, the worm wheel 96 and the output branching gear 108 also rotate together therewith.

A second clutch 116, serving as a clutch configuring the reverse rotation drive force transmission section, is housed inside the second housing portion 100 of the case body 38.

Figure 5:
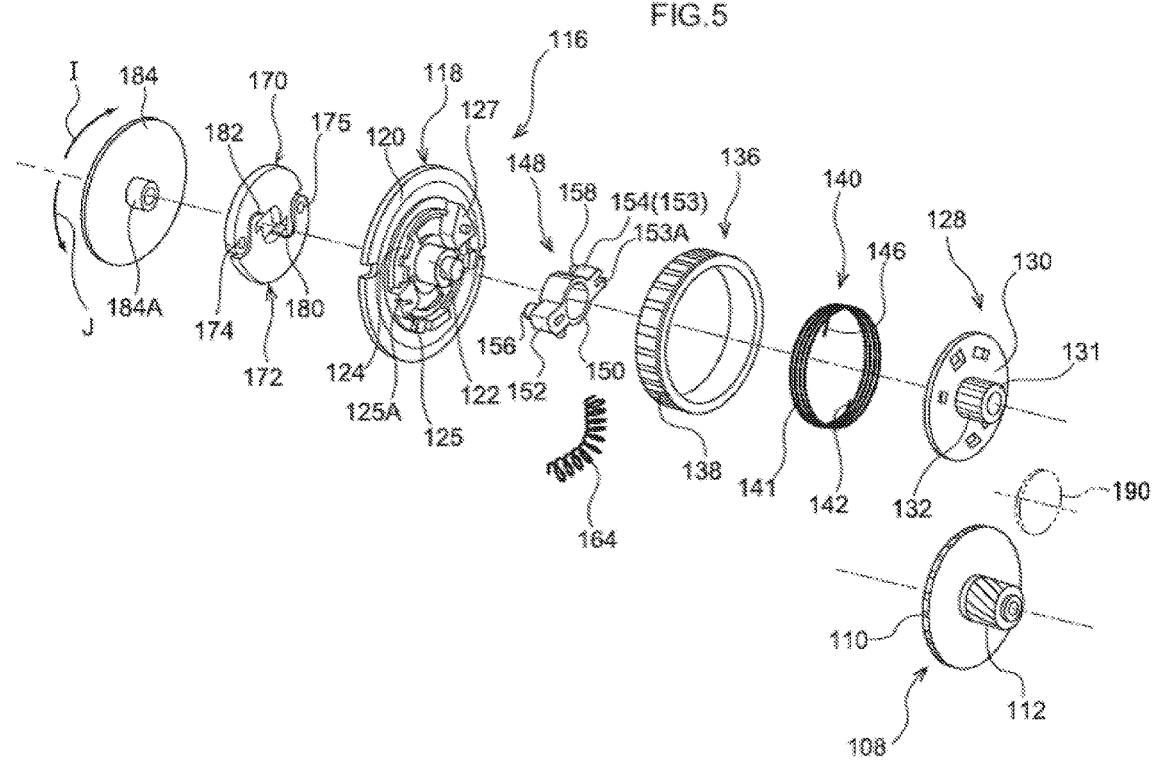
FIG. 5 is an exploded perspective view illustrating a configuration of relevant portions of a second clutch that is a configuration member of a webbing take-up device.
Figure 6:
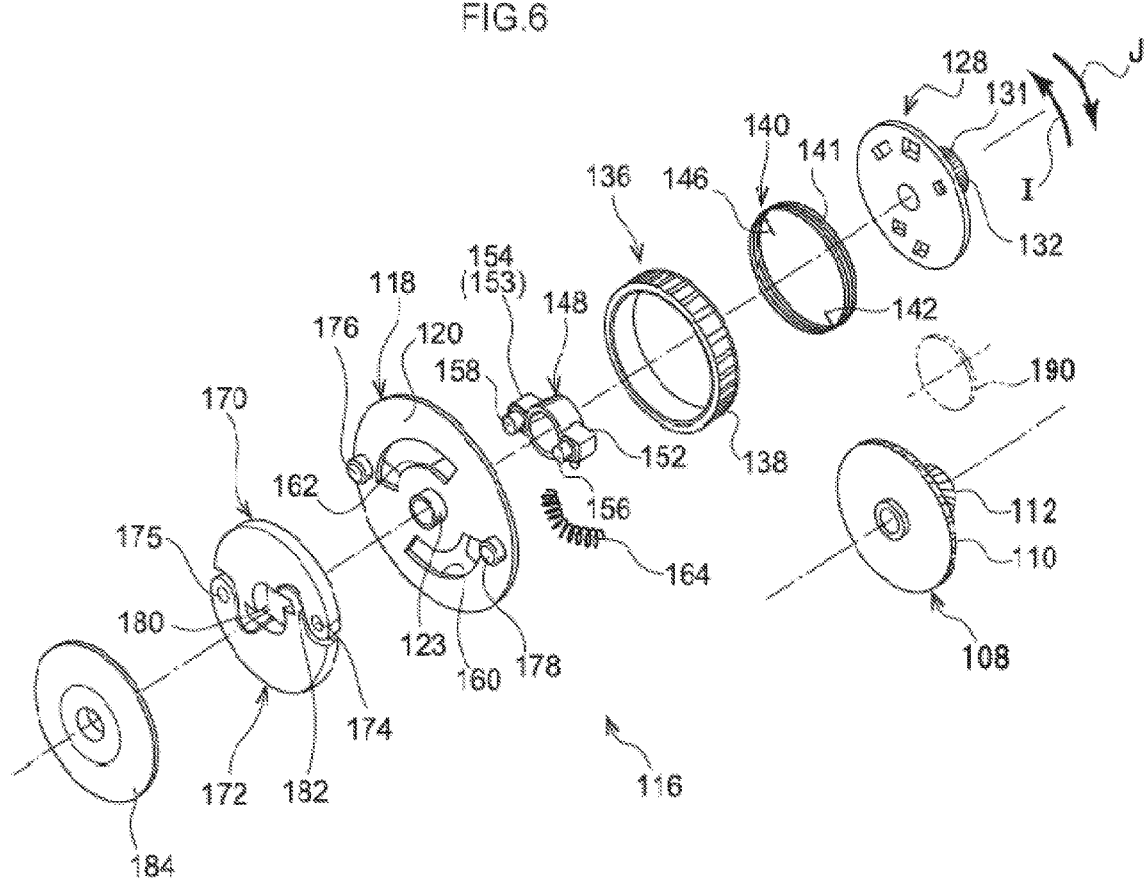
FIG. 6 is an exploded perspective view illustrating a configuration of relevant portions of a second clutch that is a configuration member of a webbing take-up device.
Figure 7:
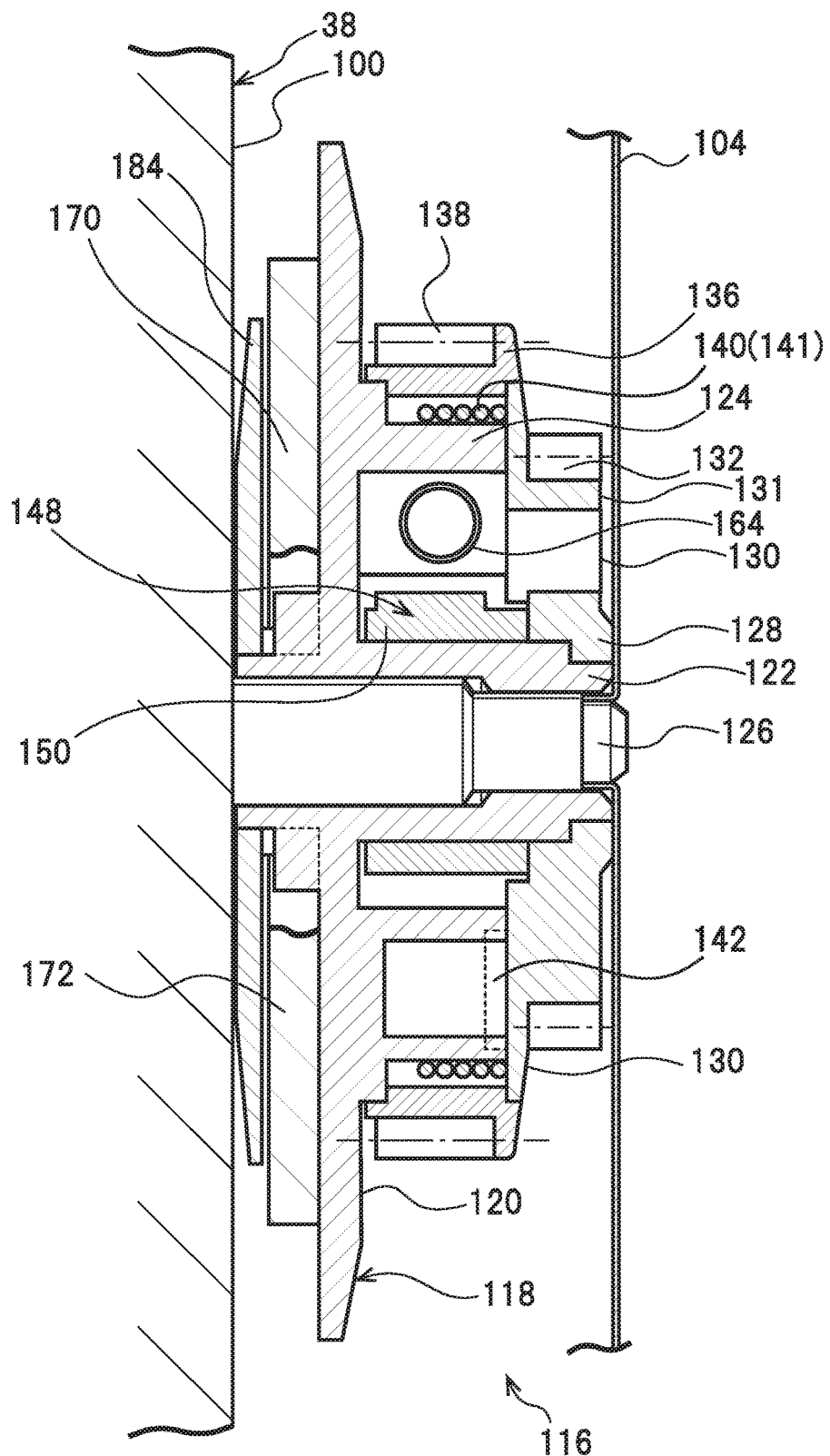
FIG. 7 is a cross-section illustrating a configuration of relevant portions of a second clutch that is a configuration member of a webbing take-up device.

FIG. 5 and FIG. 6 are exploded perspective views illustrating configuration of the second clutch 116. FIG. 7 illustrates configuration of the second clutch 116 in cross-section. As illustrated in FIG. 5 to FIG. 7, the second clutch 116 includes a base 118 serving as a first rotating body, and a rotor 128 that is attached to the base 118 so as to rotate integrally together with the base 118. The second clutch 116 also includes a clutch gear 136, serving as a second rotating body, a clutch spring 140, serving as a spring provided between the base 118 and the clutch gear 136 and as a transmission member, and a lever 148, serving as a transmission member rotatably supported by the base 118. The second clutch 116 also includes a pair of clutch weights 170 and 172 supported by the base 118, and a spacer 184 attached to the base 118.

The base 118 includes a circular disk portion 120 formed in a circular disk shape, a circular column shaped support shaft portion 122 projecting toward one axial direction side of the circular disk portion 120 at an axial center portion of the circular disk portion 120, and a side wall portion 124 with a substantially C-shaped cross-section formed coaxially and disposed around the support shaft portion 122. Further, the base 118 includes a block shaped first spring catch portion 125, at which a first spring catch groove 125A, to which an end portion of one side of the clutch spring 140 is caught, is formed, and that projects out in the same direction as the projection direction of the support shaft portion 122. A radial direction outside face of the first spring catch portion 125 is formed with a circular cylinder face shape with the same radius of curvature as an outer peripheral face of the side wall portion 124.

As illustrated in FIG. 8A, the first spring catch groove 125A formed in the first spring catch portion 125 is formed in a groove shape opening at the radial direction outside of the base 118 and at one axial direction side (the rotor 128 side) of the base 118. The first spring catch groove 125A is configured including side wall portions K1 and K2 disposed parallel to each other with a space therebetween, and a bottom wall portion K3 forming a terminal face in a depth direction (an extending direction from an opening, which is at the radial direction outside of the base 118, of the first spring catch groove 125A) of the first spring catch groove 125A. As viewed along the axial direction of base 118, the side wall portions K1 and K2 (the first spring catch groove 125A) extend from the outer circumference side of the base 118 toward substantially the axis side (inner side) of the base 118, in detail, are inclined toward the radial direction inside of the base 118 on progression toward another (arrow J direction) side about the axis of the base 118. A groove width W1 of the first spring catch groove 125A, namely a clearance between the side wall portion K1 and the side wall portion K2, is set as a width slightly larger than the wire diameter of a first catch portion 142 of the clutch spring 140, described later. Note that an open end of the first spring catch groove 125A at the one axial direction side of the base 118 is closed off by a circular disk portion 130 of the rotor 128, described later.

Figure 8B:
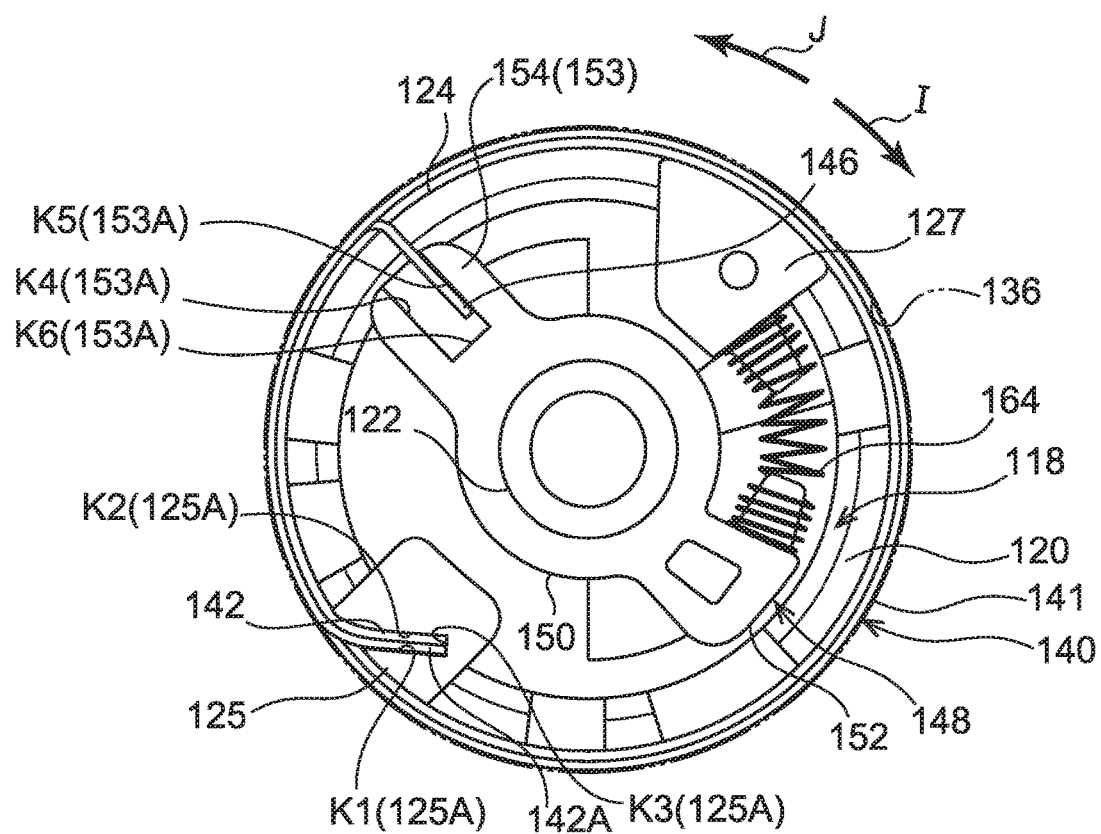

Note that, instead of the first spring catch groove 125A, it is possible to apply a catch hole, whose side view is substantially as the same as the side view of the first spring catch groove 125A shown in FIGS. 8A and 8B, whose one end side is opened, whose another side is formed with a bottom wall portion K3, and which has a hole dimension substantially the same as the W1 described above.

As illustrated in FIG. 5 and FIG. 6, the base 118 includes a circular cylinder shaped support shaft portion 123 projecting toward the opposite side of the circular disk portion 120 to the side provided with the support shaft portion 122. The circular disk portion 120 of the base 118 further includes support shafts 176 and 178 projecting out toward the side of the clutch weights 170 and 172 at the radial direction outside of the support shaft portion 123. The support shafts 176 and 178 are disposed at uniform intervals around the circumferential direction of the base 118. A pair of elongated holes 160 and 162 are formed around and along the circumferential direction of the base 118 at locations at the radial direction outside of the support shaft portions 122 and 123 on the circular disk portion 120 of the base 118. Coupling projections 156 and 158 of the lever 148, described later, engage with the elongated holes 160 and 162, and the coupling projections 156 and 158 are capable of moving along the circumferential direction of the circular disk portion 120 within the respective elongated holes 160 and 162. An catch wall 127 that abuts one end portion of a return spring 164, described later, projects out from the circular disk portion 120.

A support rod 126 projecting out from a central portion of a bottom wall of the second housing portion 100 is inserted inside the tube of the support shaft portion 123, such that the base 118 described above, together with the spacer 184, are supported by the case body 38, described later, so as to be capable of rotating about the support rod 126.

The rotor 128 is provided at the one axial direction end side of the support shaft portion 122 (on the right side in FIG. 5 and FIG. 6). The rotor 128 includes the circular disk portion 130 formed in a circular disk shape, and a tube shaped portion 131 formed in a tube shape projecting out from the axial center of the circular disk portion 130 toward the opposite side to the base 118. The rotor 128 is fixed to the base 118 so as to be capable of rotating integrally together with the base 118 by engaging a claw portion provided to the side wall portion 124 of the base 118 with the circular disk portion 130. Outer teeth 132 which is a spur teeth (gear) are formed on an outer circumferential portion of the tube shaped portion 131. The outer teeth 132 mesh with the gear portion 110 of the output branching gear 108 described above via a counter gear 190. Note that the counter gear 190 is rotatably supported by a shaft support portion, not illustrated in the drawings.

The clutch gear 136 is provided coaxially to, and capable of rotating relative to, the base 118 at the radial direction outside of the side wall portion 124 of the base 118. Outer teeth 138 which is a spur teeth (gear) are formed on an outer circumferential portion of the clutch gear 136. The outer teeth 138 mesh with the outer teeth 44 (see FIG. 2) of the container 42 described above. An internal diameter dimension of the clutch gear 136 is sufficiently larger than an external diameter dimension of the side wall portion 124 of the base 118, and a ring shaped gap is formed between an inner peripheral face of the clutch gear 136 and the outer peripheral face of the side wall portion 124. The clutch spring 140, configured by a torsion coil spring, is disposed coaxially in the ring shaped gap.

The clutch spring 140 includes a coil portion 141 that is wound (coiled) into a ring shape between the outer peripheral face of the side wall portion 124 of the base 118 and the inner peripheral face of the clutch gear 136. An end portion on the one side of the clutch spring 140 is bent toward the radial direction inside of the coil portion 141 to configure the first catch portion 142. As illustrated in FIG. 8A, the first catch portion 142 is inclined with respect to the radial direction of the coil portion 141 so as to correspond to that of the first spring catch groove 125A described above. An end portion on another side of the clutch spring 140 is bent toward the radial direction inside of the coil portion 141 to configure a second catch portion 146. The second catch portion 146 extends along the radial direction of the coil portion 141 so as to correspond to a second spring catch groove 153A formed in the lever 148, described later. The first catch portion 142 and the second catch portion 146 are disposed at a specific spacing to each other around the circumferential direction of the coil portion 141. An internal diameter dimension of the coil portion 141 in a natural state is set as a smaller dimension than an external diameter dimension of the side wall portion 124 of the base 118. The coil portion 141 is accordingly urged in a direction so as to decrease the diameter under its own elastic force when the coil portion 141 is assembled the side wall portion 124 of the base 118. The coil portion 141 is accordingly in close contact with the outer peripheral face of the side wall portion 124 of the base 118 in an assembled state of the coil portion 141 to the side wall portion 124 of the base 118. A clearance is provided between the coil portion 141 and the inner peripheral face of the clutch gear 136 in the assembled state of the coil portion 141 to the side wall portion 124 of the base 118.

The first catch portion 142 of the clutch spring 140 is fitted into and caught by the first spring catch groove 125A formed in the first spring catch portion 125 of the base 118. Moreover, the second catch portion 146 of the clutch spring 140 is fitted into and caught by the second spring catch groove 153A formed in a second spring catch portion 153 of the lever 148, described later.

The lever 148 includes a circular cylinder shaped shaft receiving portion 150. The support shaft portion 122 of the base 118 passes through the inside a tube of the shaft receiving portion 150, thereby supporting the lever 148 so as to be capable of rotating relative to the support shaft portion 122 (the base 118) about the axis of the support shaft portion 122. At an outer peripheral portion of the shaft receiving portion 150, a coupling portion 152 and a coupling portion 154 are provided in a pair projecting out along the radial directions at opposite sides to each other in the circumferential direction (opposite sides at 180° to each other).

The circular column shaped coupling projection 156 and coupling projection 158 are provided projecting out from the pair of respective coupling portions 152 and 154 toward the circular disk portion 120 side of the base 118. The coupling projections 156 and 158 respectively engage with engagement pawls 180 and 182 provided to the pair of the clutch weight 170 and the clutch weight 172, described later.

The coupling portion 152 of one of the coupling portions of the lever 148 is abutted by one end portion of the return spring 164, this being a torsion coil spring. Another end portion of the return spring 164 abuts the catch wall 127 projecting out from the circular disk portion 120 of the base 118. The return spring 164 always urges the lever 148 in one direction about the axis of the base 118 (the arrow I direction in FIG. 5 and FIG. 6). The pair of coupling projections 156 and 158 of the lever 148 are normally retained in a state abutting one length direction end portion (arrow I direction side end portions in FIG. 5 and FIG. 6) of each of the pair of elongated holes 160 and 162 of the circular disk portion 120.

As illustrated in FIG. 8A, the coupling portion 154 of the another of the coupling portions of the lever 148 is configured as the second spring catch portion 153 to which the second catch portion 146 of the clutch spring 140 is caught. The second spring catch portion 153 is formed with the second spring catch groove 153A into which the second catch portion 146 of the clutch spring 140 is fitted. Accordingly, as illustrated in FIG. 8A and FIG. 8B, when the lever 148 rotates toward the another direction about the axis (the arrow J direction in FIG. 8A and FIG. 8B) with respect to the base 118 against the elastic force of the return spring 164, the second catch portion 146 of the clutch spring 140 is moved toward one winding direction of the clutch spring 140 (the arrow J direction in FIG. 8A and FIG. 8B), enlarging the external diameter dimension of the coil portion 141 of the clutch spring 140. The second spring catch groove 153A is configured including side wall portions K4 and K5 and a bottom wall portion K6, similarly to the first spring catch groove 125A described above. In the present exemplary embodiment, in a state in which the lever 148 is supported by the base 118, the side wall portions K4 and K5 are substantially parallel to the radial direction of the base 118. A groove width W2 of the second spring catch groove 153A, namely a clearance between the side wall portion K4 and the side wall portion K5, is set as a width sufficiently wider than the wire diameter of the second catch portion 146 of the clutch spring 140. The clutch spring 140 accordingly has good easy of assembly to the base 118 and the lever 148.

Moreover, when the external diameter dimension of the coil portion 141 of the clutch spring 140 is enlarged in this manner, the coil portion 141 of the clutch spring 140 presses and contact on the inner peripheral face of the clutch gear 136. In this state, a specific frictional force arises between an outer peripheral portion of the clutch spring 140 and the inner peripheral face of the clutch gear 136, such that the frictional force couples the clutch spring 140 and the clutch gear 136 integrally to one another.

As illustrated in FIG. 5 to FIG. 7, the pair of the clutch weight 170 and the clutch weight 172 that are respectively formed in substantially semicircular plate shapes are disposed on another axial direction side of the base 118 (the opposite side to the rotor 128). The pair of clutch weights 170, 172 are formed with the same weight as each other, and are provided on opposite sides to each other around the circumferential direction of the circular disk portion 120 (on opposite sides at 180° to each other). Circular shaft receiving holes 174, 175 are formed at one circumferential direction sides of the pair of clutch weights 170, 172. The circular column shaped support shaft 176 and the support shaft 178 projecting out from the circular disk portion 120 of the base 118 fit rotatably into the respective shaft receiving holes 174, 175. The respective clutch weights 170, 172 are thereby supported by the base 118 so as to be capable of 16 and 18 (capable of tilt-move) about the respective support shafts 176, 178 (shaft receiving holes 174, 175) in the radial direction of the base 118.

The one clutch weight 170 includes a substantially U-shaped engagement pawl 180 that engages with the coupling projection 158 of the lever 148 described above. The other clutch weight 172 likewise includes a substantially U-shaped engagement pawl 182 that engages with the coupling projection 156 of the lever 148. The pair of the clutch weight 170 and the clutch weight 172 are thereby synchronized (interlocked) through the lever 148, and are normally retained at the radial direction inside of the base 118 under the urging force of the return spring 164 acting on the lever 148

As illustrated in FIG. 5 to FIG. 7, the circular disk shaped spacer 184 is disposed on the opposite side of the pair of clutch weights 170, 172 to the base 118. A tube shaped boss portion 184A that fits together with an outer circumferential portion of the support shaft portion 123 of the base 118 projects out from a central portion of the spacer 184. The spacer 184 prevents the pair of clutch weights 170, 172 from falling off the base 118, and also prevents the pair of the clutch weight 170 and the clutch weight 172 from interfering on the bottom wall of the second housing portion 100 of the case body 38.

Note that in the second clutch 116, when the rotor 128 rotates toward the another direction about its axis (the arrow J direction in FIG. 5 and FIG. 6), the base 118 that is coupled integrally to the rotor 128 rotates toward the another direction about its axis together with the rotor 128. Accordingly, the pair of the clutch weight 170 and the clutch weight 172 supported by the base 118 rotate about the axis of the base 118 following the base 118. When this occurs, centrifugal force acts on the pair of the clutch weight 170 and the clutch weight 172, such that rotation torque acts on the clutch weight 170 about the support shaft 176, and rotation torque acts on the clutch weight 172 about the support shaft 178.

Accordingly, when the magnitudes of the rotation torques are at a specific value or greater, namely, when the rotation speeds of the clutch weight 170 and the clutch weight 172 are at a specific value or greater, the pair of the clutch weight 170 and the clutch weight 172 respectively rotate about the support shaft 176 and the support shaft 178 toward the radial direction outside of the base 118 against the urging force of the return spring 164 acting on the lever 148. Accordingly, configuration is made such that the lever 148, in which the coupling projection 158 is engaged with the engagement pawl 180 of the clutch weight 170, and the coupling projection 156 is engaged with the engagement pawl 182 of the clutch weight 172, rotates toward the another direction about the axis with respect to the base 118 (the arrow J direction in FIG. 8A and FIG. 8B).

In the second clutch 116 configured as described above, configuration is made such that rotation force of the output shaft 68 of the motor 66 is transmitted to the rotor 128 through the gears 72, 74, the worm shaft 76, the worm gear 84, the output branching gear 108, and the counter gear 190. Configuration is made such that when this is performed, when the output shaft 68 of the motor 66 rotates in the forward direction (the arrow C direction in FIG. 2), the rotor 128 rotates about its axis toward the one direction (the arrow I direction in FIG. 2) together with the base 118, and when the output shaft 68 of the motor 66 rotates in the reverse direction (the arrow D direction in FIG. 2), the rotor 128 rotates about its axis toward the another direction (the arrow J direction in FIG. 2) together with the base 118.

The total speed reduction ratio of the worm gear 84, the worm wheel portion 112 of the output branching gear 108, the gear portion 110 of the output branching gear 108, the counter gear 190, the outer teeth 132 of the rotor 128, the outer teeth 138 of the clutch gear 136, and the outer teeth 44 of the container 42 (the reverse rotation drive force transmission section) is set sufficiently lower than the speed reduction ratio of the worm gear 84 and the worm wheel 96 (the forward rotation drive force transmission section).

As illustrated in FIG. 1, the in the webbing take-up device 10, a controller 300 controls power supply to the motor 66. The controller 300 is configured by a driver 302 and an ECU 307. The motor 66 is electrically connected to a battery 304 installed in the vehicle through the driver 302, and current from the battery 304 is supplied through the driver 302. Configuration is made in which the driver 302 is connected to the ECU 307, and through the driver 302, the ECU 307 controls whether or not to supply power to the motor 66, and controls the direction and magnitude of the supplied current.

The ECU 307 is respectively connected to a buckle switch 306 that outputs signals according to whether or not an occupant is wearing the webbing 28, and a forward monitoring device 308 that outputs signals according to the distance between the vehicle and obstacles ahead of the vehicle.

The buckle switch 306 outputs an ON signal to the ECU 307 when a tongue plate provided to the webbing 28 is coupled to a buckle device (neither of which are illustrated in the drawings), and outputs an OFF signal to the ECU 307 when a coupled state of the tongue plate to the buckle device has been released. Namely, the buckle switch 306 outputs either the ON signal or the OFF signal described above to the ECU 307 according to whether or not the tongue plate and the buckle device are coupled together, this corresponding to whether or not the occupant is wearing the webbing 28.

The forward monitoring device 308 includes an infrared sensor 310 provided in the vicinity of a vehicle front end section. The infrared sensor 310 emits infrared rays toward the front of the vehicle, and receives infrared rays reflected by other vehicles or obstacles that are moving or are stationary in front of the vehicle (for ease of explanation, "obstacles" in the following explanation includes other vehicles that are moving or are stationary).

The forward monitoring device 308 includes a calculation section 312. The calculation section 312 calculates distances to obstacles based on the time taken for infrared rays emitted from the infrared sensor 310 to be reflected by the obstacles and return to the infrared sensor 310. The calculation section 312 outputs an obstacle detection signal Os based on the calculation results to the ECU 307. The obstacle detection signal Os is at a Low level if a distance to an obstacle is a specific value or greater, and is at a High level if the distance to an obstacle is below the specific value.

Operation and Advantageous Effects of the Present Exemplary Embodiment

Next, explanation follows regarding operation and advantageous effects of the present exemplary embodiment.

In the webbing take-up device 10 configured as described above, in a stored state of the webbing 28 taken up on the spool 20 in a layered shape, when the webbing 28 is pulled while pulling on the tongue plate, not illustrated in the drawings, the webbing 28 is pulled out while rotating the spool 20 in the pull-out direction against the urging force of the spiral spring 52 that urges the spool 20 toward the take-up direction.

In a state in which the webbing 28 has been pulled out, the webbing 28 is placed in a worn state over the body of the occupant by entraining the webbing 28 around the front of the body of the occupant seated in a seat, inserting the tongue plate into the buckle device, and retaining the tongue plate in the buckle device.

In the worn state of the webbing 28 by the occupant, the webbing 28 restrains the occupant comparatively weakly using the urging force of the spiral spring 52. In this state, the ECU 307 is input with the ON signal from the buckle switch 306.

When the occupant stops the vehicle and releases the tongue place from the buckle device, the spool 20 rotates in the take-up direction under the urging force of the spiral spring 52. However, since the urging force of the spiral spring 52 is set so as to be comparatively weak, the spool 20 rotates in the take-up direction with a comparatively weak rotation force commensurate with the urging force of the spiral spring 52.

When this occurs, the ECU 307 is input with the OFF signal from the buckle switch 306. The ECU 307 that is input with the OFF signal outputs a control signal to the driver 302 to start power supply to the motor 66, and the driver 302 input with this control signal rapidly rotates the output shaft 68 of the motor 66 in the reverse direction (the arrow D direction). The rapid rotation of the output shaft 68 in the reverse direction is transmitted to the worm shaft 76 through the gears 72, 74, thereby rapidly rotating the worm gear 84.

The rapid rotation of the worm gear 84 is transmitted to the worm wheel 96 of the first clutch 94, thereby rotating the worm wheel 96 in the pull-out direction at a rotation speed of a specific value or greater. When this occurs, the worm wheel 96 and the adaptor (spool 20) are maintained in a mechanically decoupled state by the transmission member, such that the worm wheel 96 spins freely relative to the adaptor (spool 20).

In contrast, the rapid rotation of the worm gear 84 is transmitted to the rotor 128 of the second clutch 116 through the output branching gear 108 and the counter gear 190, and the rotor 128 rotates toward the another direction about its axis (toward the arrow J direction) at a rotation speed of a specific value or greater. The base 118 that is coupled integrally to the rotor 128 accordingly rotates in the another direction about its axis at a rotation speed of the specific value or greater.

The rotation of the base 118 is transmitted to the clutch weight 170 through the support shaft 176 and the shaft receiving hole 174, and is transmitted to the clutch weight 172 through the support shaft 178 and the shaft receiving hole 175, such that the clutch weight 170 and the clutch weight 172 rotate about the axis of the base 118 at a rotation speed of the specific value or greater following the base 118. Accordingly, centrifugal force acts on the clutch weight 170 and the clutch weight 172. As a result, the clutch weight 170 and the clutch weight 172 rotate (tilt-move) toward the radial direction outside of the base 118 about the support shafts 176, 178 against the urging force of the return spring 164 acting on the lever 148.

Accordingly, the lever 148 rotates toward the another direction about its axis (the arrow J direction in FIG. 8A and FIG. 8B) with respect to the base 118, with the coupling projection 158 engaged with the engagement pawl 180 of the clutch weight 170, and the coupling projection 156 engaged with the engagement pawl 182 of the clutch weight 172.

When the lever 148 is rotated about the axis toward the another direction with respect to the base 118, the second catch portion 146 of the clutch spring 140 is moved toward the one winding direction of the clutch spring 140 (the arrow J direction in FIG. 8A and FIG. 8B) by the lever 148. As a result, the external diameter dimension of the coil portion 141 of the clutch spring 140 increases, placing the outer peripheral portion of the coil portion 141 of the clutch spring 140 in close contact with the inner peripheral face of the clutch gear 136. The rotation of the clutch spring 140 is thereby transmitted to the clutch gear 136, and the clutch gear 136 rotates toward the another direction about its axis. The outer teeth 138 of the clutch gear 136 are meshed with the outer teeth 44 of the container 42, so rotating the container 42 in the take-up direction, and thereby rotating the spool 20 in the take-up direction. This rotation of the spool 20 compensates the insufficiency in the urging force of the spiral spring 52 to take up and store the webbing 28 in a layered shape on the spool 20 (what is known as a "take-up assist mechanism").

Moreover, when this occurs, since the spool 20 rotates with a low torque, the webbing 28 can be safely taken up and stored onto the spool 20. In the present exemplary embodiment, the webbing 28 can easily be pulled out from the spool 20 even when performing the take-up assist described above. Namely, the spool 20 can easily be rotated in the pull-out direction against the torque of the take-up assist.

When the webbing 28 is fully taken up on the spool 20, the power supply to the motor 66 is cut off, stopping rotation of the output shaft 68 of the motor 66. The rotation of the rotor 128 thereby stops, thus stopping rotation of the base 118 that is coupled integrally to the rotor 128.

When the rotation of the base 118 stops, the clutch weight 170 and the clutch weight 172 rotate toward the radial direction inside of the base 118 under the elastic force of the clutch spring 140 and the elastic force of the return spring 164 acting on the lever 148. The clutch spring 140 accordingly returns once more to its natural state, and the outer peripheral portion of the coil portion 141 separates from the inner peripheral face of the clutch gear 136, immediately releasing the coupling between the clutch spring 140 and the clutch gear 136 described above. The coupling of the spool 20 to the output shaft 68 of the motor 66 through the second clutch 116 is thereby released, permitting the webbing 28 taken up on the spool 20 to be pulled out again.

In a traveling state of the vehicle, the calculation section 312 calculates the distances to obstacles in front of the vehicle based on the detection results of the infrared sensor 310 of the forward monitoring device 308. For example, when there are no obstacles present in front of the vehicle, or when an obstacle is present in front of the vehicle, but the distance from the obstacle to the vehicle is the specific value or greater, the Low level signal is output from the calculation section 312. However, when the distance from the vehicle to the obstacle in front falls below the specific value, the High level signal is output from the calculation section 312.

When the High level signal is input to the ECU 307 from the calculation section 312, the ECU 307 outputs a specific operation signal to the driver 302. In this state, the driver 302 input with the operation signal starts power supply to the motor 66, rapidly rotating the output shaft 68 in the forward direction (the arrow C direction). Accordingly, when the worm wheel 96 of the first clutch 94 is rotated in the take-up direction (the arrow A direction), the worm wheel 96 and the adaptor (spool 20) rotate together integrally. The webbing 28 is thereby taken up onto the spool 20, and any slight looseness of the webbing 28, known as "slack", is eliminated, thereby increasing the restraining force of the webbing 28 on the body of the occupant (what is known as a "pre-tensioner mechanism").

As described above, in the webbing take-up device 10 according to the present exemplary embodiment, the single motor 66 is capable of achieving the mutually conflicting performances demanded by the take-up assist mechanism and the pre-tensioner mechanism.

Note that in the present exemplary embodiment, as illustrated in FIG. 8A and FIG. 8B, when the lever 148 is rotated in the another direction about the axis of the base 118 (the arrow J direction) with respect to the base 118, the first catch portion 142 of the clutch spring 140 abuts the side wall portion K1 which is on the arrow J direction side of the first spring catch groove 125A, and a terminal end 142A of the first catch portion 142 abuts the bottom wall portion K3 of the first spring catch groove 125A. Accordingly, compression stress arises in the first catch portion 142 in a direction to compress (shorten the length of) the first catch portion 142. This thereby enables bending stress arising in the first catch portion 142 to be alleviated (smaller). This thereby enables to improve the durability of the clutch spring 140 that configures part of the second clutch 116 with respect to repeated deformations.

In a close contact state of the outer peripheral portion of the coil portion 141 of the clutch spring 140 against the inner peripheral face of the clutch gear 136, namely in a state in which the spool 20 is being rotated in the take-up direction by the motor 66, when rotation force in the one direction about the axis of the base 118 (the arrow J direction) is input to the clutch gear 136, for example due to pulling the webbing 28 in the pull-out direction, the clutch gear 136 imparts a diameter-enlarging force to the coil portion 141 of the clutch spring 140, thereby increasing the urging force, toward the side wall portion K1 and the bottom wall portion K3 side of the first spring catch groove 125A, of the first catch portion 142. Namely, in the second clutch 116 configured in this manner, stress is liable to increase (build up) in the first catch portion 142 of the clutch spring 140 caught to the first spring catch groove 125A. However, in the present exemplary embodiment, the terminal end 142A of the first catch portion 142, where stress is liable to increase, is configured so as to abut the bottom wall portion K3 of the first spring catch groove 125A, thereby enabling bending stress arising in the first catch portion 142 to be alleviated. This thereby enables to improve the durability of the clutch spring 140 that configures part of the second clutch 116 with respect to repeated deformations.

Moreover, when acting of the pre-tensioner side, in the state in which the outer peripheral portion of the coil portion 141 of the clutch spring 140 is in close contact with the inner peripheral face of the clutch gear 136, the clutch gear 136 rotates the coil portion 141 of the clutch spring 140 in the one direction about the axis of the base 118 (the arrow I direction). The second catch portion 146 of the clutch spring 140 is thereby pressed against the side wall portion K5 of the second spring catch groove 153A. Due thereto, A force acts to attempt to rotate the lever 148 toward the one direction about the axis of the base 118 (the arrow I direction), and the coil portion 141 of the clutch spring 140 is urged in a diameter decreasing direction, thereby discouraging compression stress in the first catch portion 142 in the direction to compress the first catch portion 142 of the clutch spring 140 from arising. Namely, the present exemplary embodiment enables the application of excessive force on the respective components configuring the second clutch 116 to be suppressed when acting of the pre-tensioner side.

In the present exemplary embodiment, in the natural state, the internal diameter dimension of the coil portion 141 of the clutch spring 140 is set as a smaller dimension than the external diameter dimension of the side wall portion 124 of the base 118. The coil portion 141 is accordingly urged in a direction to decrease its diameter under its own elastic force when the coil portion 141 is assembled to the side wall portion 124 of the base 118. The clutch spring 140 can accordingly exhibit a function of assisting the return spring 164 described above. Moreover, it is possible to omit the return spring 164 described above by appropriately setting the internal diameter dimension of the coil portion 141 of the clutch spring 140 and the like. This configuration accordingly enables a reduction in the number of components configuring the second clutch 116.

First Catch Portion of Clutch Spring and First Spring Catch Portion According to a Modified Example Next, explanation follows regarding a first catch portion of a clutch spring and a first spring catch portion according to a modified example of the exemplary embodiment described above. Note that members and portions with the same functions as in the exemplary embodiment described above are allocated the same reference numerals as in the exemplary embodiment described above, and explanation thereof is omitted.

Figure 9B:
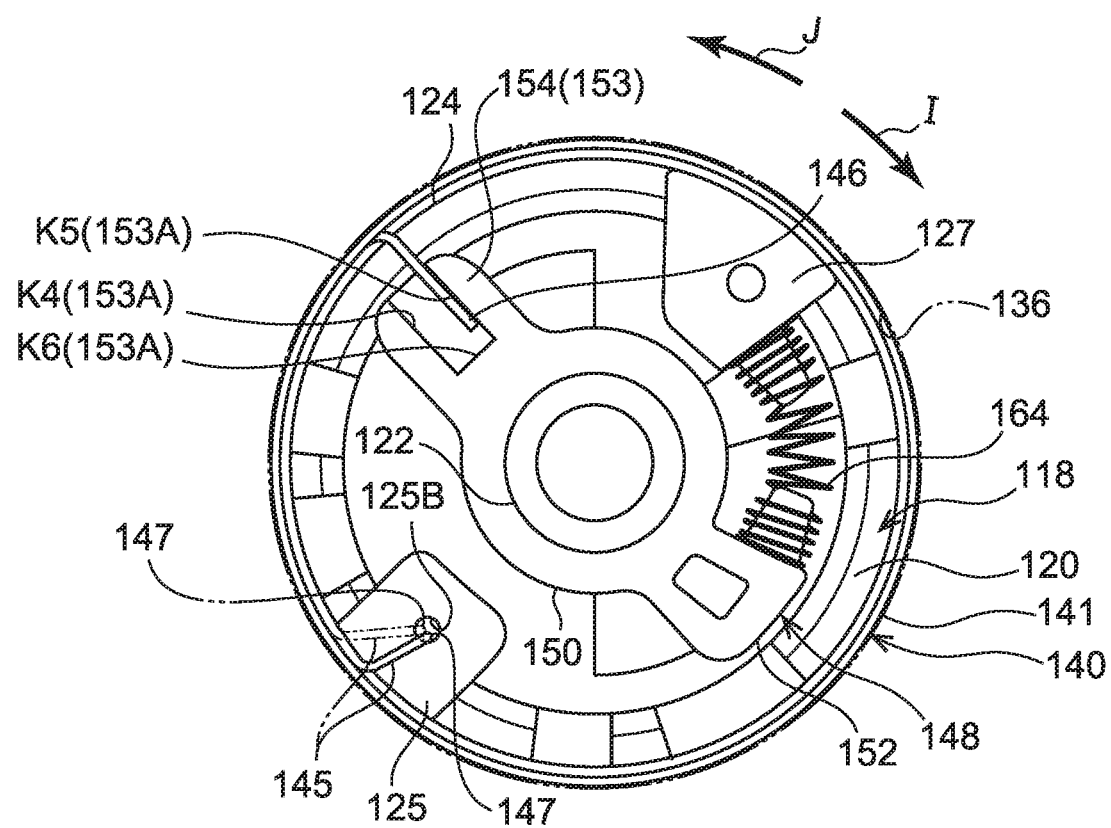

As illustrated in FIG. 9A and FIG. 9B, a clutch spring 140 of the modified example includes an inclined portion 145 that is formed by bending an end portion on one side of the clutch spring 140 toward the radial direction inside of the coil portion 141, and a first catch portion 147 that extends along the axial direction of the coil portion 141 (toward the opposite side to the rotor 128 side (see FIG. 5)) due to a leading end portion of the inclined portion 145 being bent toward this opposite side.

The first spring catch portion 125 of the modified example is formed with a first spring catch hole 125B that extend in the axis of rotation of the base 118 as a depth direction thereof, that is open at the rotor 128 side and that has an inner peripheral edge of an inner peripheral face, that is formed in a circular shape as viewed along the axial direction of the base 118. The first catch portion 147 is disposed inside the first spring catch hole 125B, thereby catching the first catch portion 147 to the first spring catch hole 125B.

In the modified example described above, when the lever 148 rotates toward the another direction about the axis of the base 118 (in the arrow J direction) with respect to the base 118, the first catch portion 147 of the clutch spring 140 moves along the inner peripheral face of the first spring catch hole 125B with the first catch portion 147 remaining caught in the first spring catch hole 125B (remaining contacting on the inner peripheral face of the first spring catch hole 125B). This thereby enables stress acting on the inclined portion 145 of the clutch spring 140 to be dispersed. Namely, the inclined portion 145 of the clutch spring 140 can be suppressed from deforming locally during actuation of the lever 148. This thereby enables to improve the durability of the clutch spring 140 configuring part of the second clutch 116 with respect to repeated deformations.

Note that in the exemplary embodiment and modified example described above, explanation has been given regarding an example in which configurations increasing the durability of the clutch spring 140 with respect to repeated deformations are applied to an end portion side on the one side of the clutch spring 140. However, the present invention is not limited thereto. For example, the configurations described above for increasing the durability of the clutch spring 140 with respect to repeated deformations may be respectively applied to the end portion side on the one side and an end portion side on the another side of the clutch spring 140.

In the present exemplary embodiment, explanation has been given regarding an example of a configuration in which the lever 148 is rotated to decouple the spool 20 from the motor 66 when the webbing 28 is pulled with greater than a specific tensile force. However, the present invention is not limited thereto. Whether or not to employ a configuration in which the spool 20 is connection-separated from the motor 66 when the webbing 28 is pulled with greater than the specific tensile force may be set as appropriate in consideration of, for example, the strength of the respective components configuring the second clutch 116.

In the present exemplary embodiment, explanation has been given regarding an example in which the clutch weights 170 and 172 are supported by the base 118 so as to be capable of tilt-moving. However, the present invention is not limited thereto. For example, configuration may be made in which the clutch weights 170 and 172 are supported by the spacer 184 so as to be capable of tilt-moving. It is sufficient that the clutch weights 170 and 172 are supported so as to be capable of tilt-moving by a member that rotates integrally together with the base 118.

Explanation has been given regarding an exemplary embodiment of the present invention. However, the present invention is not limited to the above description, and obviously various modifications other than those described above may be implemented.

What is claimed is:

1. A webbing take-up device comprising:
   a spool that takes up a webbing that is to be worn by an occupant;
   a first rotating body that includes a first spring catch portion;
   a second rotating body that is provided so as to be capable of rotating integrally with the spool, and that rotates due to rotation of the first rotating body being transmitted to the second rotating body;
   a spring that is provided between the first rotating body and the second rotating body, and that includes a coil portion wound into a ring shape along an outer circumferential portion of the first rotating body, an end portion at one side of the spring being caught at the first spring catch portion; and
   a lever that is capable of rotating in a circumferential direction of the first rotating body, that includes a second spring catch portion to which an end portion at another side of the spring is caught, and that enlarges a diameter of the coil portion by moving the end portion at the another side of the spring toward one side in the circumferential direction of the first rotating body in a case in which the lever is rotated toward the one side in the circumferential direction of the first rotating body so as to transmit rotation of the first rotating body to the second rotating body via the coil portion,
   wherein, in a case in which the lever is rotated toward the one side in the circumferential direction of the first rotating body, at least one of a terminal end of the end portion at the one side of the spring or a terminal end of the end portion at the another side of the spring abuts either the first spring catch portion or the second spring catch portion, and
   wherein the first spring catch portion is one of a groove portion or a hole portion which extends from an outer circumference side of the first rotating body toward an inner side of the first rotating body, and
   in the case in which the lever is rotated toward the one side in the circumferential direction of the first rotating body, a terminal end of the end portion at the one side of the spring abuts a bottom face of the one of the groove portion or the hole portion.

2. The webbing take-up device of claim 1, wherein the end portion at the one side of the spring abuts the first spring catch portion when the lever is rotated toward the one side in the circumferential direction of the first rotating body.

3. The webbing take-up device of claim 2, wherein, in a state in which the diameter of the coil portion has been enlarged, the second rotating body rotates the lever toward another side in the circumferential direction of the first rotating body via the coil portion of the spring and the end portion at the another side of the spring, due to the webbing being pulled with greater than a specific tensile force.

4. The webbing take-up device of claim 2, wherein: the first spring catch portion is one of a groove portion or a hole portion, which extends from an outer circumference side of the first rotating body toward an inner side of the first rotating body, an end portion at the outer circumference side of the first spring catch portion being opened, and an end portion at the inner side being formed with a wall portion; and the terminal end of the end portion at the one side of the spring abuts the wall portion when the lever is rotated toward the one side in the circumferential direction of the first rotating body.

5. The webbing take-up device of claim 1, wherein, in a state in which the diameter of the coil portion has been enlarged, the second rotating body rotates the lever toward another side in the circumferential direction of the first rotating body via the coil portion of the spring and the end portion at the another side of the spring, due to the webbing being pulled with greater than a specific tensile force.

6. The webbing take-up device of claim 1, wherein the bottom face is located at a side opposite to an opening of the one of the groove portion or the hole portion in an extending direction of the end portion at the one side of the spring.

7. A webbing take-up device comprising:
a spool that takes up a webbing that is to be worn by an occupant;
a first rotating body that includes a first spring catch portion;
a second rotating body that is provided so as to be capable of rotating integrally with the spool, and that rotates due to rotation of the first rotating body being transmitted to the second rotating body;
a spring that is provided between the first rotating body and the second rotating body, and that includes a coil portion wound into a ring shape along an outer circumferential portion of the first rotating body, an end portion at one side of the spring being caught at the first spring catch portion; and
a lever that is capable of rotating in a circumferential direction of the first rotating body, that includes a second spring catch portion to which an end portion at another side of the spring is caught, that enlarges a diameter of the coil portion by moving the end portion at the another side of the spring toward one side in the circumferential direction of the first rotating body in a case in which the lever is rotated toward the one side in the circumferential direction of the first rotating body so as to transmit rotation of the first rotating body to the second rotating body via the coil portion,
wherein, in a case in which the lever is rotated toward the one side in the circumferential direction of the first rotating body, at least one of the end portion at the one side of the spring or the end portion at the another side of the spring moves while remaining caught at either the first spring catch portion or the second spring catch portion,
wherein the first spring catch portion is a hole portion which extends in a direction of an axis of rotation of the first rotating body, and,
in the case in which the lever is rotated toward the one side in the circumferential direction of the first rotating body, the end portion at the one side of the spring, which extends in a direction of an axis of rotation of the first rotating body, moves inside the hole portion while remaining caught at the hole portion.

8. The webbing take-up device of claim 7, wherein the end portion at the one side of the spring moves while remaining caught at the first spring catch portion when the lever is rotated toward the one side in the circumferential direction of the first rotating body.

9. The webbing take-up device of claim 8, wherein, in a state in which the diameter of the coil portion has been enlarged, the second rotating body rotates the lever toward another side in the circumferential direction of the first rotating body via the coil portion of the spring and the end portion at the another side of the spring, due to the webbing being pulled with greater than a specific tensile force.

10. The webbing take-up device of claim 8, wherein: the first spring catch portion is a hole portion which extends in a direction of an axis of rotation of the first rotating body; and the end portion at the one side of the spring moves inside the hole portion while remaining disposed inside the hole portion when the lever is rotated toward the one side in the circumferential direction of the first rotating body.

11. The webbing take-up device of claim 7, wherein, in a state in which the diameter of the coil portion has been enlarged, the second rotating body rotates the lever toward another side in the circumferential direction of the first rotating body via the coil portion of the spring and the end portion at the another side of the spring, due to the webbing being pulled with greater than a specific tensile force.

12. The webbing take-up device of claim 7, wherein
in the case in which the lever is rotated toward the one side in the circumferential direction of the first rotating body, the end portion at the one side of the spring moves on an inner peripheral face of the hole portion while contacting the inner peripheral face.

* * * * *